(12) United States Patent
Raina et al.

(10) Patent No.: US 7,468,970 B2
(45) Date of Patent: Dec. 23, 2008

(54) ROUTING OF MOBILE AGENTS IN A NETWORK

(75) Inventors: Manik Raina, Bangalore (IN); Subhas Kumar Ghosh, Bangalore (IN); Ranjeet Kumar Patro, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 436 days.

(21) Appl. No.: 11/257,220

(22) Filed: Oct. 24, 2005

(65) Prior Publication Data

US 2007/0091856 A1    Apr. 26, 2007

(51) Int. Cl.
*H04L 12/56* (2006.01)

(52) U.S. Cl. ..................................... 370/338
(58) Field of Classification Search .................. 370/328, 370/338, 355, 356, 392, 395.2, 397, 399, 370/401; 709/201, 202, 203, 205, 218
See application file for complete search history.

(56) References Cited

U.S. PATENT DOCUMENTS

| | | | | |
|---|---|---|---|---|
| 6,466,963 | B1* | 10/2002 | Shigemori | 709/202 |
| 6,622,157 | B1* | 9/2003 | Heddaya et al. | 709/202 |
| 7,213,047 | B2* | 5/2007 | Yeager et al. | 709/202 |
| 7,254,608 | B2* | 8/2007 | Yeager et al. | 709/203 |
| 7,328,243 | B2* | 2/2008 | Yeager et al. | 709/205 |
| 2001/0029526 | A1* | 10/2001 | Yokoyama et al. | 709/218 |
| 2006/0165030 | A1* | 7/2006 | Fox et al. | 370/328 |
| 2006/0198345 | A1* | 9/2006 | Chen | 370/338 |
| 2007/0053367 | A1* | 3/2007 | Tyebji | 370/401 |
| 2007/0280252 | A1* | 12/2007 | Chuang | 370/395.2 |

OTHER PUBLICATIONS

W. Jansen et al., "NIST Special Publication 800-19-Mobile Agent Security", 2000, National Institute of Standards and Technology.
S. Marwaha et al., "Mobile Agents based Routing Protocol for Mobile Ad Hoc Networks", 2002, IEEE Globecomm.
Q. Wu et al., "On Computing Mobile Agent Routes for Data Fusion in Distributed Sensor Networks", IEEE Transactions on Knowledge and Data Engineering, vol. 16, No. 6, Jun. 2004, pp. 1-14.
H. Qi et al., "Mobile-agent-based Collaborative Signal and Information Processing in Sensor Networks", Aug. 2003, Proceedings of the IEEE vol. 91-8, pp. 1-10.
E. Elnahrawy et al., "Cleaning and Querying Noisy Sensors", Proceedings of the 2nd ACM International Conference on Wireless Sensor Networks and applications, 2003, pp. 78-87.
N. Reijers et al., "Efficient Code Distribution in Wireless Sensor Networks", Proceedings of the 2nd ACM International Conference on Wireless Sensor Networks and applications, 2003, pp. 60-67.
R. Karp, "Reducibility among Combinatorial Problems", In R. Miller and J. Thatcher, editors, Complexity of Computer Computations, pp. 85-103, Plenum Press, 1972.

* cited by examiner

*Primary Examiner*—CongVan Tran
(74) *Attorney, Agent, or Firm*—Kris T. Fredrick

(57) ABSTRACT

A single mobile agent, multiple mobile agents, or a query mobile agent traverse the nodes of a network. As the single mobile agent, multiple mobile agents, or a query mobile agent visits a nodes of a network, the mobile agent performs a function at the node such as depositing data or software at the node or collecting data from the node. The single mobile agent, multiple mobile agents, or a query mobile agent may be arranged so that all nodes of the network are visited.

25 Claims, 7 Drawing Sheets

ROUTING OF MOBILE AGENTS IN A NETWORK

RELATED APPLICATION

The present application contains subject matter similar to the subject matter contained in U.S. application Ser. No. 11/188,929 filed on Jul. 25, 2005.

TECHNICAL FIELD OF THE INVENTION

The present invention relates to mobile agents that are routed through a network such as a single channel wireless sensor network.

BACKGROUND OF THE INVENTION

Networks such as ad hoc wireless sensor networks are increasingly being used for sensing, detection, and tracking, and are being applied in military, ecological, environmental, and domestic system applications for monitoring and control. Wireless sensor networks are also being used to automate buildings, universities, factories, etc.

The nodes in a wireless sensor network comprise sensors that communicate with one another via a wireless channel. The composition and deployment scenarios of sensors in a wireless sensor network are varied.

The wireless sensor network is often considered to be one of the most constrained computational environments because memory, power, and computational capabilities of the wireless sensor network are all limited. On the other hand, these limited capabilities also mean that the nodes of the wireless sensor network can be provided at low cost. However, this lower cost makes the sensor nodes prone to failure and energy depletion, which are typically countered by resorting to dense deployment of sensors.

In many applications of wireless sensor networks, sensor nodes are randomly deployed, sometimes scattered by airplanes in hostile terrain. Such networks are, therefore, referred to as ad hoc wireless sensor networks. Because of the ad hoc nature of these networks, few assumptions can be made about their topologies, and algorithms that route data and/or code through such networks must provably work over any arbitrary deployment.

The present invention relates to mobile agents that have the capability of satisfactorily operating in such environments.

SUMMARY OF THE INVENTION

According to one aspect of the present invention, a method of traversing a network having a plurality of nodes comprises the following: launching multiple mobile agents each capable of performing at least one function; traversing the nodes of the network with the multiple mobile agents; and, performing the at least one function at each of at least some of the nodes in the network, wherein the at least one function is performed by the mobile agents.

According to another aspect of the present invention, a method of traversing a network by a query mobile agent is provided where the network includes a plurality of nodes. The method comprises the following: a) while the query mobile agent is visiting one of the nodes of the network, transmitting a query to at least some other nodes of the network; b) receiving responses to the query; c) identifying from the responses another of the nodes of the network; d) transmitting the query agent to the another node; and, repeating a)-d).

According to still another aspect of the present invention, a method of traversing a network having a plurality of nodes comprises the following: a) transmitting a mobile agent to one node of the network; b) executing the mobile agent to reconfigure the one node of the network; and, c) repeating a) and b) until at least some other nodes of the network have been visited by the mobile agent.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
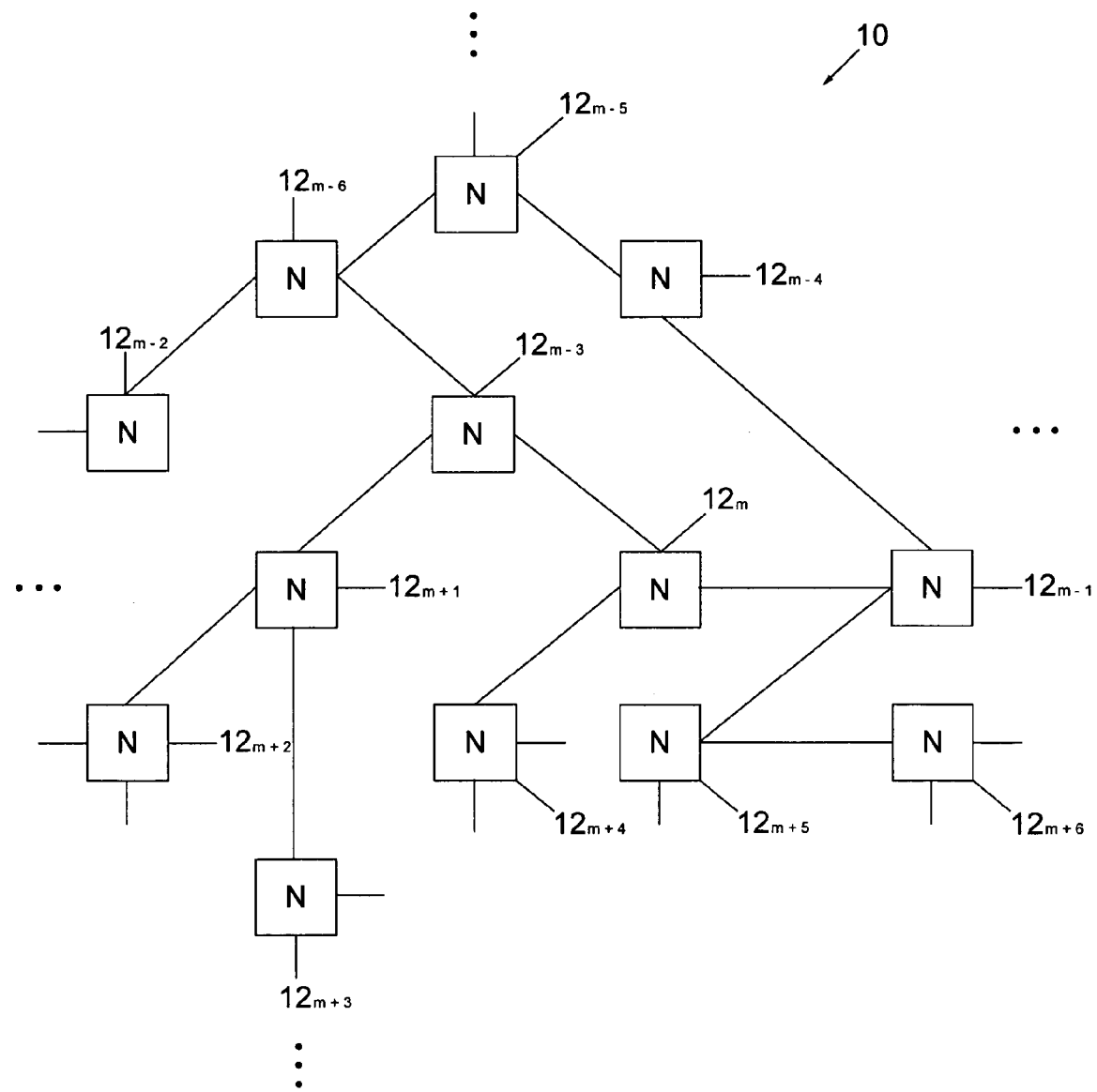
FIG. 1 illustrates a network comprising a plurality of nodes which are configured in accordance with an embodiment of the present invention.

FIG. 1 shows a network 10 comprising nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$. The network 10, for example, may be a sensor network such as a wireless sensor network, and the nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$, for example, may be sensor nodes such as wireless sensor nodes. In the case where the network 10 is a wireless network, the links between the nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$ are wireless links such as infrared links, ultrasonic links, RF links, or any other type of wireless link. Alternatively, in a case where the network 10 is not a wireless network, these links may be provided by electrical wires, optical fiber cables, or other physical connections between the nodes.

As shown in FIG. 1, each of the nodes may be in direct communication with one or more other nodes and may be in indirect communication with one or more of the remaining nodes. For example, because of range limitations or otherwise, the node $12_{m-3}$ is in direct communication with the nodes $12_{m-6}, 12_m,$ and $12_{m+1}$, and is in indirect communication with other nodes such as the nodes $12_{m-2}$ and $12_{m-5}$ through node $12_{m-6}$. The nodes $12_{m-6}, 12_m,$ and $12_{m+1}$ are considered to be one-hop neighbor nodes of the node $12_{m-3}$ because they are in direct communication with the node $12_{m-3}$. However, other nodes such as the nodes $12_{m-4}, 12_{m-1},$ and $12_{m+4}$ are considered to be in indirect communication with the node $12_{m-3}$ because they can communicate with the node $12_{m-3}$ only through other nodes.

Figure 2:
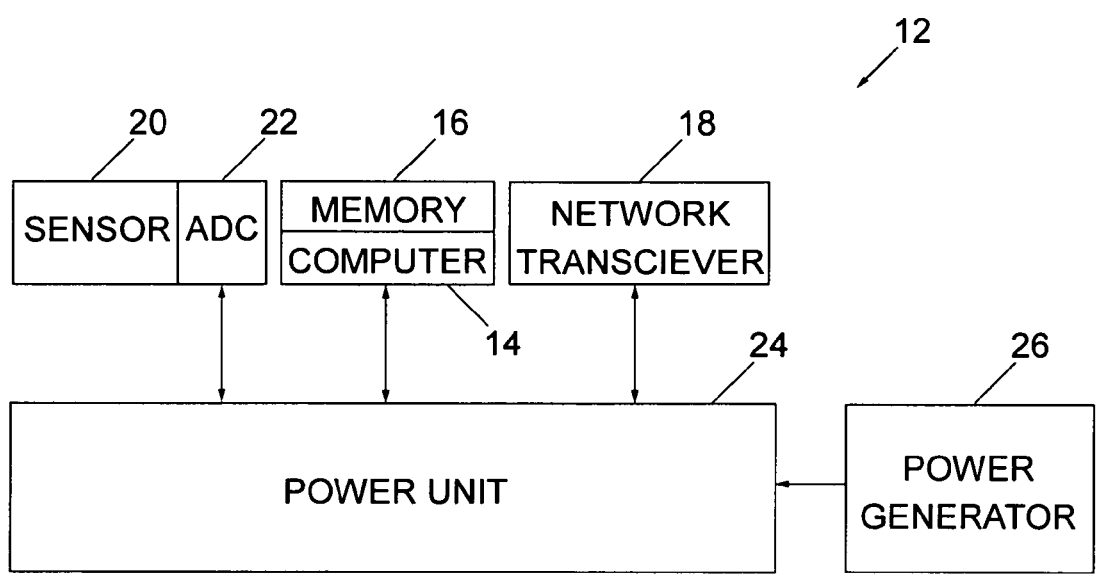
FIG. 2 illustrates a representative one of the nodes of the sensor network shown in FIG. 1.

As shown in FIG. 2, the node 12, which, for example, may be representative of each of the nodes shown in FIG. 1, includes a computer 14, a memory 16, and a network transceiver 18. Alternatively, the computer 14 may be a processor or a computer/data processor combination. Accordingly, the word computer is used generically herein.

The network transceiver 18 permits communication between the node 12 and the other nodes in the network 10.

For example, in the case where the network 10 is a wireless network, the transceiver 18 supports communication with the one hop neighbor nodes of the node 12, and the communications transmitted or received by the network transceiver 18 can be wireless communications over wireless links as discussed above. Alternatively, in the case where the network 10 is not a wireless network, the communications transmitted or received by the network transceiver 18 can be communications over physical or other links.

In the case where the node 12 is a sensor node, the node 12 also includes a sensor 20. If the sensor 20 is an analog sensor, an A/D converter 22 is provided to convert the analog signal from the sensor 20 to a digital signal for processing by the computer 14. The sensor 20 can be any sort of sensor suitable for the particular application of the network 10. A power unit 24 is supplied with power from a power generator 26, and provides power to and supports communication between the computer 14, the memory 16, the network transceiver 18, and the A/D converter 22. The power generator 26 can be a battery, a power supply, or any other type device capable of providing appropriate power for the node 12.

If the network 10 is a wireless sensor network, the node 12 has a communication radius in addition to a sensing radius. The communication radius defines a distance over which the node 12 is capable of effectively communicating with its one-hop neighbor nodes. The sensing radius defines a distance over which the sensor 20 of the node 12 is capable of effectively sensing a condition. The communication radius of the node 12 should be at least as great as the sensing radius of the sensor 20 of the node 12. Each of the other nodes of the network may be similarly constructed. Moreover, each node 12 of the network 10 should have at least one other node 12 within its communication radius. These relationships ensure that each of the nodes 12 of the network 10 is able to communicate any condition that it senses to at least one neighbor node in the network 10. If desired, the communication radius of the node 12 can be twice the sensing radius of the sensor 20 of the node 12.

Any network can be viewed as a graph such that the vertices of the graph are the nodes of the network. The graph may be designated G and the vertices or nodes may be designated 1, 2, . . . , n.

Several assumptions can be made with respect to formulation of the network 10. For example, it may be assumed that each of the nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$ contains a unique node identifier which may be pre-distributed to them. The node identifier for the $n^{th}$ sensor in the graph G can be represented as $ID_n$. There must exist a bijection f such that f: $IDn \rightarrow Z_{n(G)}+1$, where $Z_{n(G)}+1$ is the set of integers $\{1, 2, 3, \ldots, n(G)+1\}$.

It is also assumed that each node or vertex knows the node identifiers of it's one hop neighbors.

It is further assumed that the edge set E(G), which represents the set of communication links in the Wireless Sensor Network G, forms according to the following spatial constraint:

$$\forall u, v \in V(G)(e_{uv} \in E(G) \equiv \|\vec{r}_u - \vec{r}_v\| \leq r)$$

where $\vec{r}_u$ and $\vec{r}_v$ are the location vectors for the vertices u and v, where r is the transmission radius and is assumed to be the same for all vertices, and where $\|\ \|$ is, the Euclidean norm.

A graph G(V,E) is defined as a collection of vertices V and the edges E between the vertices. This graph shall be used to represent sensors and the communication links between them. Each sensor shall be represented by a unique $u \in V(G)$, and $e_{uv} \in E(G)$ if a communication link exists between the vertices u and v.

A mobile agent $A_i$ is defined as an entity consisting of $\{D_t^i, S_t^i\}$ where $D_t^i$ is the data carried by the mobile agent $A_i$ and $S_t^i$ is the state of the mobile agent $A_i$ at time t. Code C is defined as C: $\{D_t^i, S_t^i\} \rightarrow \{D_{t+1}^i, S_{t+1}^i\}$. The mobile agent $A_i$ need not itself carry code. The code could instead reside on every sensor $u \in V(G)$. Each of the mobile agents $A_i$ forms an association $<A_i, u>$ with the vertex $u \in V(G)$ if the mobile agent $A_i$ resides at the vertex u. Thus, an association $<A_i, u>$ implies that the mobile agent $A_i$ resides at the vertex u. A movement of the mobile agent $A_i$ from vertex x to vertex y is defined as jump($A_i$,x,y): $<A_i,x> \rightarrow <A_i,y>$ for some vertices x,y$\in$V(G).

An Itinerary $U_i$ of the mobile agent $A_i$ is defined as follows:

$$\forall x \in V(G), x \in V(U_i) \equiv \exists y, z \in V(G) \text{ such that } \text{jump}(A_i,y,x)\hat{\ }\text{jump}(A_i,x,z) \quad (1)$$

Further, $$e_{xy} \in E(U_i) \equiv x, y \in V(U_i)\hat{\ }(\text{jump}(A_i,x,y) \vee \text{jump}(A_i,y,x)) \quad (2)$$

Clearly, it can be seen that $U_i \subset G$. The itinerary is the subset of G taken by the mobile agent $A_i$ while performing it's task.

An Itinerary history of the mobile agent $A_i$ is defined as $H_{A_i}$ such that $H_{A_i} \subseteq V(G)$. $H_{A_i}$ is contained in $D_t^i$. Thus, $$\text{jump}(A_i, x, y) \rightarrow \begin{cases} \text{for } y \notin H_{A_i}: \\ \text{push}(H_{A_i}, f(y)) \\ g() \\ \langle A_i, x \rangle \rightarrow \langle A_i, y \rangle \\ \text{return} \\ \text{for } y \in H_{A_i} \\ \text{return} \end{cases} \quad (3)$$

where push( ) and pop( ) are LIFO stack operators, and g( ) is a function performed at each vertex visited by the mobile agent $A_i$. The function g( ) could perform a multitude of tasks at each node including gathering data, depositing data, setting some flags, triggering operations in every sensor, determining if the sensors are running up-to-date software/bug updates and redeploying software and/or updates as necessary or desired, etc.

A vertex v has a set of Neighbors, N(v), defined as follows:

$$\forall v, x \in V(G)(x \in n(V) \equiv e_{xv} \in E(G)) \quad (4)$$

Local knowledge is defined as the questions which can be answered with the information in $(<A_i,u>,D_t^i,S_t^i,N(u))$, where u is the vertex at which the mobile agent $A_i$ currently finds itself.

Given a randomly deployed wireless sensor network that is represented by a fully connected graph G(E,V), the problem to be solved is to visit every sensor in the graph.

Determining if a Hamiltonian cycle exists in a graph G is difficult with only local knowledge. In exploring this difficulty, various necessary and sufficient conditions may be enumerated.

Two necessary conditions may be formulated. First, every vertex of a Hamiltonian graph has degree $\geq 2$. This first condition means that each vertex in the graph has at least two one-hop neighbors. Second, if the graph G has a Hamiltonian cycle, then for each nonempty set $S \subseteq G$, G–S has at the most |S| components.

In order to determine the first condition, each node would have to be investigated to determine if its degree is less than two. For this investigation, each vertex v or any node in N(v) which knows that v has degree less than two would have to be visited. Hence, information of every node is necessary to determine if the necessary condition is met.

For the second condition, the task is to determine if a subset of the graph G forms a component even though achievable in polynomial time. To perform this task, an evaluation must be made for every subset of the graph G and for the graph G. What makes this task difficult is that the subset count of V(G) increases as $2^{|V(G)|}$.

Four sufficient conditions may also be formulated. First, if G is a graph and if $|V(G)|>3$, the graph G is Hamiltonian if $\delta(G) \geq n(G)/2$, where $\delta(G)$ is the least degree of the graph G. Second, for a simple graph G, for $\forall u$, and for $v \in V(G)$, if $\delta(u)+\delta(v) \geq n(G)$, then the graph G is Hamiltonian. Third, a simple n vertex graph G is Hamiltonian iff the closure of G is Hamiltonian. Fourth, if the vertex degrees of a simple graph G are $d_1 \leq d_2 \leq d_3 \ldots \leq d_n$, and if $i<n/2$ implies that $d_i>i$ or $d_{n-i} \geq n-1$, the graph G is Hamiltonian.

The first, second and fourth conditions require knowledge of the degrees of all nodes in the graph G, which cannot be determined unless the mobile agent travels to every vertex in the graph G. The third condition needs information about the closure of G, which requires global information. Hence, information is needed from every vertex in the graph G in order to prove if a Hamiltonian path exists. Since the task of proving the existence of such a path does not identify the order of the cyclic sequence of edges $\epsilon E(G)$ that forms the Hamiltonian path, a heuristic based mechanism which visits every vertex to count it is possible as long as its performance is bounded. Mechanisms will be presented herein that loosen the need to visit every vertex by the agent for counting.

Considering the above, algorithms are presented that use mobile agents to visit every vertex in a graph G. These algorithms ensure that the mobile agent reaches every node in the graph G, they exploit the local information available at each vertex, and they succeed in doing so irrespective of the topology of the graph G.

The following first algorithm utilizes a single agent to traverse the network of the graph G. This algorithm can reside in the mobile agent or agents or instead can reside at each node in the graph.

---

Algorithm 1 - Visiting vertices in the graph G using a single agent.

---

```
1: agentState = firstVisit {A convention is adopted here
   such that u always denotes the ID of the sensor on which
   the mobile agent currently resides and v denotes the ID
   of the sensor on which the mobile agent was residing
   before jumping to the sensor u}
2: while stack ≠ {Φ} do
3:      if agentState == firstVisit then
4:           g( ) {Application specific activity at sensor}
5:           list = N(u) {visiting this vertex for the first
                time}
6:           if {list – u} == {Φ} then
7:                agentState = recede
8:                jump(A,u,topOfStack(stack))
9:           else
10:               find w such that (f(w) ≤ f(x)
                     ∀x∈list) ∧ (w ∉stack)
11:               if w ∈ stack ∧ f(u) > f(w) then
12:                    add (w,u) in exception list
13:                    repeat previous step of finding w
14:               end if
15:               if no such w exists then
```

---

-continued

Algorithm 1 - Visiting vertices in the graph G using a single agent.

---

```
16:                    agentState = recede
17:                    jump(A,u,topOfStack(stack))
18:               end if
19:               agentState = recede
20:               jump(A,u,w)
21:          end if
22:      else
23:          pop(stack) {We have been to this vertex before}
24:          list = N(u)
25:          find w such that f(v) ≤ f(w) ≤ f(x)(∀x∈list)∧
                    w ∉stack ∧ w ∉exceptionList
26:          if w ∈ stack ∧ f(u) > f(w) then
27:               add (w,u) in exception list
28:               repeat previous step of finding w
29:          end if
30:          if no such w exists then
31:               jump(A,u,topOfStack(stack))
32:          end if
33:          jump(A,u,w)
34:      end if
35: end while
```

Stack in the above algorithm is the same as the itinerary history $H_A$ of the mobile agent A as described above. Stack is initially empty as the mobile agent A traverses the graph. Nodes are added to Stack as the mobile agent A visits the nodes for the first time and are removed from Stack as the mobile agent A recedes to the nodes in Stack (visits them from a second time). Also, all jump operations in this algorithm implement equation (3) above.

Figure 3A:
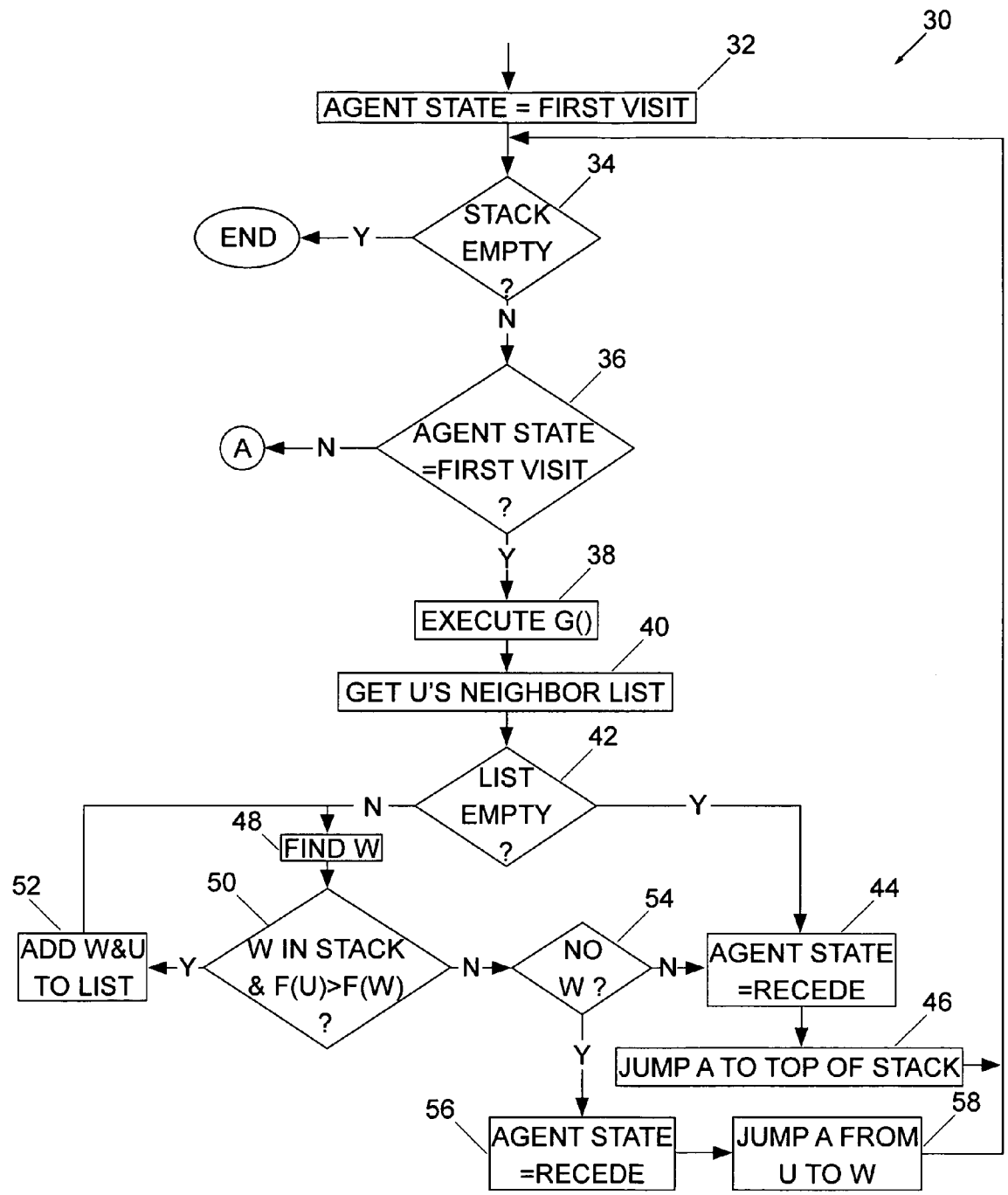
FIGS. 3A and 3B show a flow chart illustrating a program executed by a mobile agent as it traverses the network of FIG. 1.
Figure 3B:
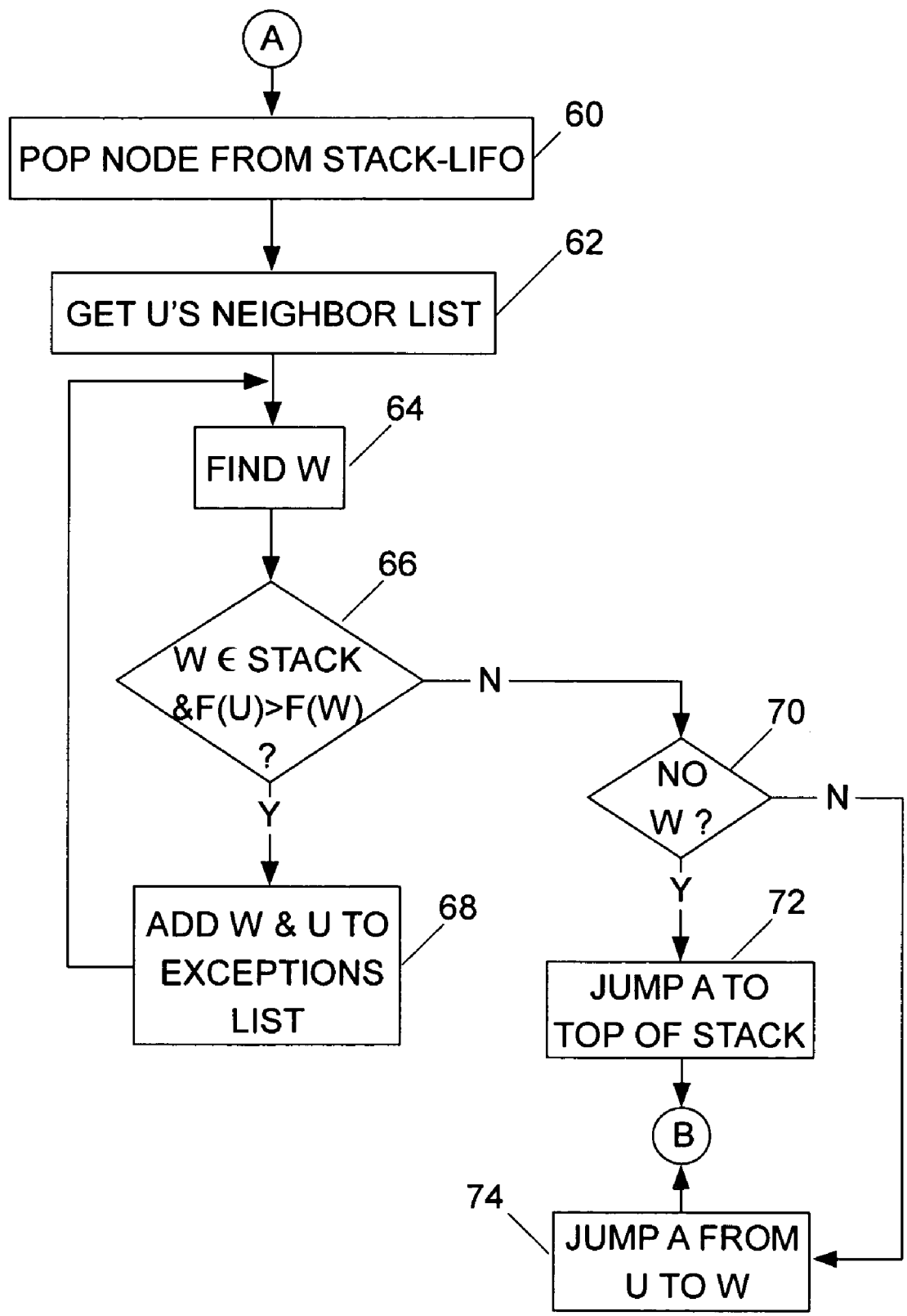

This Algorithm 1 is shown graphically in FIGS. 3A and 3B by the flow chart of a program 30 that is executed by the mobile agent A. The mobile agent A travels to various sensors, and then executes on these sensors. The mobile agent A by itself need not be sufficient for execution as it would need a processor (sensor). However, the mobile agent A can be arranged to carry all stateful information and to execute as an independent entity. At 32 of the program 30, the mobile agent A begins execution at its first node, u, the mobile agent adds node u to the top of Stack, which is a LIFO data structure of the mobile agent, and the mobile agent sets its state to the firstVisit state to indicate that the mobile agent has not been at this node before. By convention, the current node that the mobile agent is visiting is denoted u.

At 34, the mobile agent determines whether Stack is empty. When Stack is empty, all nodes of the graph have been visited and execution of the program 30 terminates.

If Stack is not empty, the mobile agent A at 36 determines whether it is in the firstVisit state. If the mobile agent A is in the firstVisit state, the mobile agent A at 38 executes an application g( ) and, at 40, queries node u for its list of neighbor nodes. The application g( ) may be any desired application such as depositing data at the current node u, updating code at the current node u, etc. The neighbor list stored at the current node u is a list of its neighbors, such as its one hop neighbors. The mobile agent A asks for this list in order to determine the next node to which it desires to be transmitted by the current node u.

The mobile agent A at 42 then determines whether u's list of neighbor nodes less the node u is empty (i.e., whether the list contains any nodes other than node u). If the list is empty, there is no node in the list for the mobile agent to visit. Therefore, the mobile agent at 44 sets its state to the recede state and, at 46, jumps to the node that is on top of the Stack. In the recede state, the mobile is transmitted back to the node (v), which is the node that the mobile agent A had visited just prior to the current node u. It should be understood that all nodes must have at least one neighbor node. Thus, if the current node u is the first node visited by the mobile agent, its neighbor list cannot be empty. Program flow then returns to 34.

If the list of neighbor nodes at node u less the node u is not empty, the mobile agent A at 48 searches the list for a node w such that the node identifier of node w is less than or equal to the node identifiers of all other nodes in the list and such that the node w is not on Stack. During this search, if the mobile agent A at 50 finds a node w in Stack whose node identifier is less than the node identifier of the current node u, the mobile agent A at 52 adds this node w to an Exceptions List that it maintains. The Exceptions List keeps track of those nodes which the mobile agent A has visited.

If the mobile agent at 50 determines that there is a node w in the neighbor list that is not in Stack or whose node identifier is not less than the node identifier of the current node u, and if the mobile agent determines at 54 that there is no node w in the neighbor list such that the node identifier of node w is less than or equal to the identifiers of all other nodes in the list and such that the node w is not on Stack, the mobile agent at 44 sets its state to recede and, at 46, jumps to the node that is on top of Stack. Program flow then returns to 34.

On the other hand, if the mobile agent A at 50 determines that there is a node w in the neighbor list that is not in Stack or whose node identifier is not less than the node identifier of the current node u, but the mobile agent A determines at 54 that there is a node w in the neighbor list such that the node identifier of node w is less than or equal to the identifiers of all other nodes in the neighbor list and such that the node w is not on Stack, the mobile agent at 56 sets its state to the recede state. At 58, the mobile agent A causes the current node u to transmit the mobile agent A from node u to node w, the mobile agent A adds node w to the top of Stack, and the mobile agent A sets its state to the firstVisit state. Program flow then returns to 34.

If the mobile agent A at 36 determines that it is not in the firstVisit state (i.e., its state is the recede state, meaning that the mobile agent A has earlier visited the current node u), the mobile agent A at 60 removes the current node u from the top of Stack and, at 62, queries current node u for its neighbor list. At 64, the mobile agent A searches this neighbor list for a node w such that, for all nodes in the neighbor list, the node identifier for node w is greater than or equal to the node identifier for the just previously visited node v and is less than or equal to the node identifiers of all other nodes in the neighbor list, such that node w is not on Stack, and such that node w is not in the Exceptions List. (As discussed above, by convention, v is used to designate the node from which the mobile agent A was transmitted to the current node u.)

During this search, if the mobile agent at 66 finds a node in Stack whose node identifier is less than the node identifier of the current node u, the mobile agent A at 68 adds this node w to the Exceptions List. If the mobile agent A at 66 determines that there is a node w in the neighbor list that is not in Stack or whose node identifier is not less than the node identifier of the current node u, and if the mobile agent A determines at 70 that there is no node w in the neighbor list such that the node identifier for node w is greater than or equal to the node identifier for the just previously visited node v and is less than or equal to the node identifiers for all other nodes in the neighbor list, such that the node w is not on Stack, and such that the node w is not in the Exceptions List, the mobile agent A at 72 jumps to the node that is on top of Stack. Program flow then returns to 34.

On the other hand, if the mobile agent A at 66 determines that there is a node w in the neighbor list that is not in Stack or whose node identifier is not less than the node identifier of the current node u, but the mobile agent A determines at 70 that there is a node w in the neighbor list such that the node identifier of node w is greater than or equal to the node identifier of the just previously visited node v and is less than or equal to the node identifiers of all other nodes in the neighbor list, such that the node w is not on Stack, and such that the node w is not in the Exceptions List, the mobile agent at 74 causes the current node u to transmit the mobile agent A from node u to node w, the mobile agent A adds node w to the top of Stack, and the mobile agent A sets its state the firstVisit state. Program flow then returns to 34.

Algorithm 1 uses two stacks (Stacks and the Exception List) so that it is unnecessary for the single mobile agent to reach each sensor to determine if it has been processed already.

Algorithm 1 uses the neighbor list (N(u)) of a vertex (or node u) to determine where it should go next. The mobile agent A utilizes a stack and an agent state which it carries with it as it moves from node to node. At any time, the mobile agent A is in one of two states {recede or firstVisit}. The mobile agent A is in firstVisit state when it visits a node for the first time and is in the recede state otherwise.

If more than one mobile agent is used, fault tolerance and latency (time required to reach all sensors) can be improved. Also, queries and agents can be merged. Accordingly, disclosed below are algorithms that traverse the sensor network using multiple agents $A_i$ and/or using one or more hybrid agents incorporating queries. The increase in fault tolerance and latency using multiple agents and the energy reduction which can be achieved using a hybrid query and agent algorithm are important improvements.

Thus, more than one mobile agent can be used in the network 10 and can be more useful than a single mobile agent approach because a single mobile agent based algorithm is more prone to sensor failure and because a single mobile agent based algorithm is more prone to longer latency times than a multiple mobile agent based algorithm.

More specifically, a single mobile agent A reaches vertices $\epsilon G$ by traversing $U_A \subset G$ (UA is the itinerary of the mobile agent A, and G is the graph representing the network being traversed by the mobile agent A). The return of the mobile agent A with its results along a path P would be unsuccessful if any vertex in the path P were to fail.

Multiple mobile agents $A_i$ {A1, A2, A3, . . . , $A_\lambda$} can be used to improve performance in the event of a sensor failure and to improve latency times. The multiple mobile agent algorithm ensures that each sensor in the graph G is labeled by only one mobile agent.

Based on a system parameter $\lambda \epsilon Z+$, where $\lambda$ is the number of mobile agents $A_i$ to be used, an initial mobile agent traverses a random path $P_I$ in the graph G. The random path $P_I = \{w_0, w_1, \ldots, w_{n-1}\}$ is a path chosen randomly such that the path has at least $\lambda$ unique vertices (in this case, $n=\lambda$) and is called the labeling path. The identities of the vertices $w_0$, $w_1, \ldots, w_{n-1}$ of the random path $P_I$ are initially saved in Stack of the initial mobile agent, and the initial mobile agent visits each of the vertices in its Stack. When the initial mobile agent visits a vertex in the random path $P_I$, the initial mobile agent labels that vertex with a unique label. Thus, a priori knowledge of the vertices in the random path $P_I$ is required.

The set of labels $L_\lambda = \{l_0, l_1, \ldots, l_{\lambda-1}\}$ is defined as the label set. The initial mobile agent A assigns labels as follows: $\chi$: $P_I \rightarrow L_\lambda$ such that $\chi(w_r) = l_r$, where r is an index that varies from 0 to $\lambda-1$. Thus, each of the vertices $w_0, w_1, \ldots, w_{n-1}$ along the random path is labeled with a corresponding one of the labels $l_0, l_1, \ldots, l_{\lambda-1}$ so that each of the vertices has a unique label.

Upon reaching $w_{n-1} \in P_j$, the initial mobile agent A replicates itself into $\lambda$ agents $A_i$ {A1, A2, A3, ..., $A_\lambda$}. Each of the mobile agents A1, A2, A3, ..., $A_\lambda$ is associated with a unique one of the labels $l_0, l_1, \ldots, l_{\lambda-1}$, and each of the mobile agents A1, A2, A3, ..., $A_\lambda$ has a Stack containing the vertices of the random path. Each of the mobile agents A1, A2, A3, ..., $A_\lambda$ traverses backwards along the random path $P_j$ looking for the vertex having its corresponding label given to that vertex by the initial mobile agent. When each of the mobile agents A1, A2, A3, ..., $A_\lambda$ finds the vertex with its corresponding label, the mobile agent begins traversing the graph according the latter part of algorithm 2 as described below. As the mobile agent travels to a node in the graph G, it colors it with its unique label, i.e., the mobile agent deposits its label at the node. If a mobile agent reaches a sensor colored by another mobile agent, it returns and looks for an un-visited node. Thus, the graph G is partitioned.

The label stored at each vertex can be represented as $\{l_i, t_i, f(u)\}$, where $l_i$ is a label or color associated with a mobile agent that has first visited the node, $t_i$ is the time at which the mobile agent was dispatched from the node which triggered execution of Algorithm 2, and f(u) is the identifier of the node which triggered execution of Algorithm 2.

Algorithm 2 reaches every sensor in the graph G, uses more than one mobile agent, and performs the processing g( ), which is application specific. However, there is a modification in the semantics of the jump call. In addition to modifying the association $<A_i,x> \rightarrow <A_i,y>$, Algorithm 2 performs an additional operation of labeling the current vertex with a label as defined above. This whole operation must be atomic. Also, each mobile agent can jump to a node u such that $u \in P_j$ iff the agent state is recede.

In algorithm 2, as before, u designates the current node that a mobile agent is currently visiting, v designates the node from which the mobile agent was transmitted to the current node u, and w designates the node to which the mobile will be transmitted from the current node u.

---

Algorithm 2 - Visiting vertices in G using $\lambda$ agents.

Require: u ← ID of the current vertex
1: choose $P_l \in V(G)$ such that $|P_l| \geq \lambda$
2: for all x $\in P_l$ do
3:   label$_{current\ node}$ ← label
4:   label ← (label + 1)mod$\lambda$
5:   jump(A,u,x) {The Agent A will find itself at the vertex corresponding to the last entry in $P_l$}
6:   replicate( ) {replicate mobile agent A into $\lambda$ agents {A1, ..., $A_\lambda$}; from this point on, each mobile agent shall execute separately. Further, each mobile agent shall have a variable called "label" which describes the label it is associated with. From this point onwards, each mobile agent executes on it's own.}
7: end for
8: $\forall A \in \{Ai\}$, agentstate$_{Ai}$ = firstVisit
9: while stack $A_i \neq \{\Phi\}$ do
10:   {each mobile agent will possess it's own stack, and all mobile agents execute this procedure independently of one another}
11:   if agentState == firstVisit then
12:     g( ) {Application specific activity at sensor}
13:     list = $N_i(u)$ {determine the subtree incident at u}
14:     if {list − u} == {$\Phi$} then
15:       agentState$_{Ai}$ = recede
16:       jump(A$_i$,u,topOfStack(stack$_{Ai}$))

---

Algorithm 2 - Visiting vertices in G using $\lambda$ agents.

17:   else
18:     find w such that (f(w) $\leq$ f(x)
           $\forall x \in$list) $\wedge$ (w $\in$stack)
19:     if w $\in$ stack $\wedge$ f(u) > f(w) then
20:       add (w,u) in exception list
21:       repeat previous step of finding w
22:     end if
23:     if no such w exists then
24:       agentState$_{Ai}$ = recede
25:       jump(A$_i$,u,topOfStack(stack$_{Ai}$))
26:     end if
27:     agentState$_{Ai}$ = recede
28:     jump(A$_i$,u,w)
29:   end if
30:  else
31:     pop(stack$_{Ai}$) {We have been to this vertex before}
32:     list = $N_i(u)$
33:     find w such that f(v) $\leq$ f(w) $\leq$ f(x)($\forall x \in$list)$\wedge$
           w $\in$stack$_{Ai}$ $\wedge$ w$\notin$exceptionList
34:     if w $\in$ stack$_{Ai}$ $\wedge$ f(u) > f(w) then
35:       add (w,u) in exception list
36:       repeat previous step of finding w
37:     end if
38:     if no such w exists then
39:       jump(A$_i$,u,topOfStack(stack$_{Ai}$))
40:     end if
41:     jump(A$_i$,u,w)
42:   end if
43: end while

---

As indicated above, Stack in Algorithm 2 of each mobile agent $A_i$ initially contains the nodes in the random path $P_j$. After each mobile agent $A_i$ begins traversing the graph G, Stack is processed in the same manner as described in connection with Algorithm 1. All jumps in Algorithm 2 are defined by Algorithm 3 below.

---

Algorithm 3 - jump semantics for $\lambda$ agents.

jump (A$_i$, u, w)
if w $\in H_{Ai}$ then
   atomic: $\chi$ (u) = $\chi$ (A$_i$) {Assign the node the label of the visiting agent}
   if atomic operation success then
     push(H$_{Ai}$,f(w))
     g( )
     <A$_i$,u> → <A$_i$,w>
   end if
else
   <A$_i$,u> → <A$_i$,w>
end if

---

Figure 4:
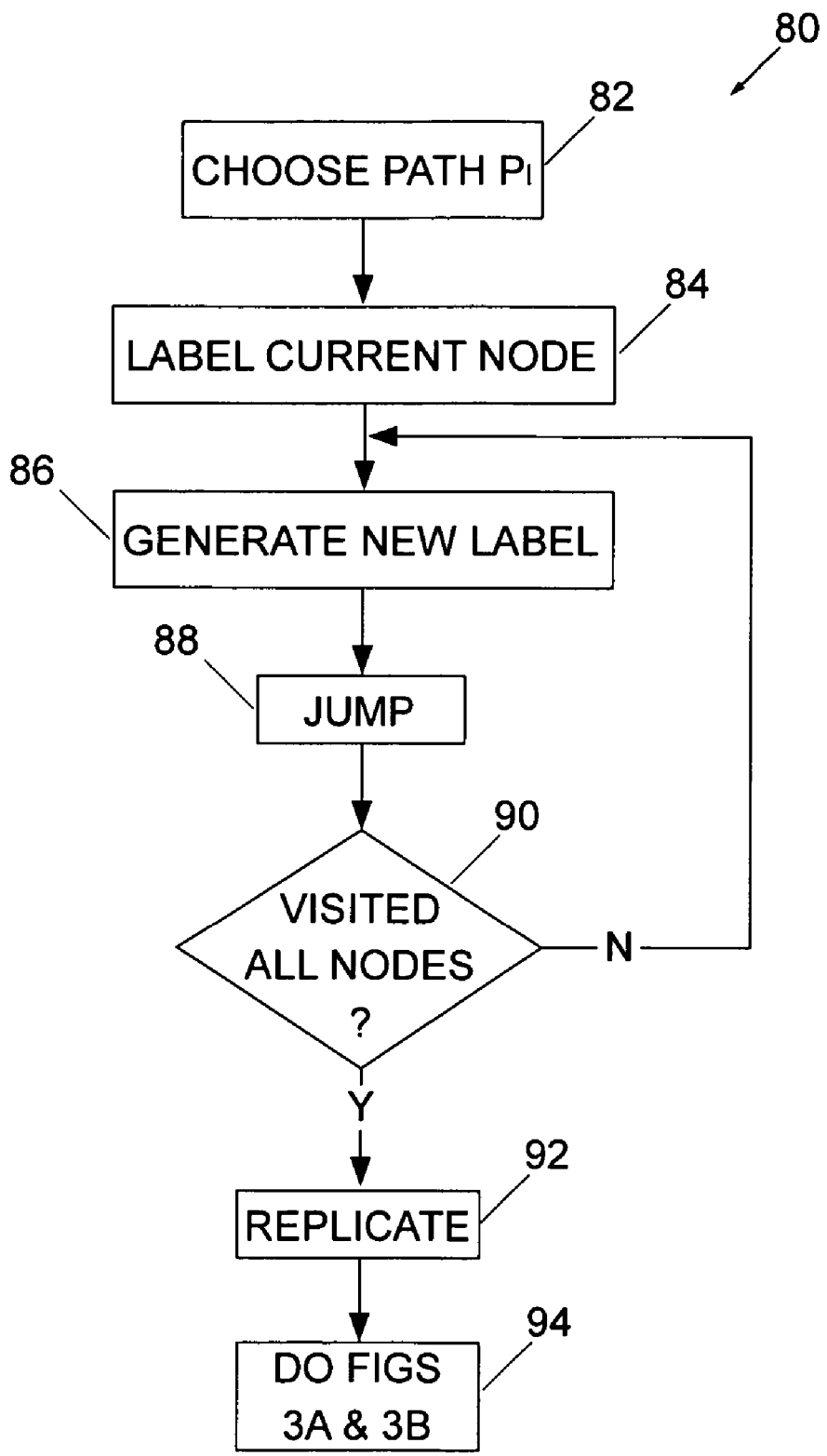
FIG. 4 shows a flow chart illustrating a program executed by mobile agents as they traverse the network of FIG. 1; and, FIGS. 5A and 5B show a flow chart illustrating a program executed by a query mobile agent as it traverses the network of FIG. 1.

Algorithm 2 is shown graphically in FIG. 4 by the flow chart of a program 80 that is executed by each of the mobile agents $A_i$. At 82 of the program 30, an initial mobile agent A begins execution by choosing a path $P_j$ in the graph V(G) (i.e., the network 10) so that the path $P_j$ contains a plurality of nodes x such that the number of nodes x is greater than or equal to the number ($\lambda$) of mobile agents $A_i$ that will traverse the graph G following replication. Stack of the initial mobile agent is loaded with the identifiers for these initial nodes x. At 84, the initial mobile agent A, sitting at one of the nodes in the path $P_j$, deposits a label at that node according to the definition $\{l_i, t_i, f(u)\}$. This label will uniquely correspond to one of the mobile agent replicas discussed above. At 86, the initial mobile agent A generates a new label by incrementing the variable label by one modulo $\lambda$ and, at 88, the one mobile agent jumps to the next node in the random path $P_j$, using the jump definition given in algorithm 3. This jump operation involves labeling this next node with the label generated at 86. At 90, the initial mobile agent determines whether it has visited all nodes x in the random path $P_I$. If not, program flow returns to 86, and 86-90 are executed repeatedly until the initial mobile has uniquely labeled each of the nodes x in the random path $P_I$. Once the initial mobile agent has visited all nodes x in the random path $P_I$, the initial mobile agent at 92 replicates itself into λ mobile agent replicas $A_i$. Each replica $A_i$ has a Stack that contains the identifiers for the nodes x in the random path $P_I$. Each mobile agent replica $A_i$ is associated with a corresponding one of the unique labels generated by the initial mobile agent at 86. Each of the mobile $A_i$ traverses the random path $P_I$ to find the node x in the random path that has been labeled with its corresponding label. Beginning at the node that uniquely corresponds to its label, each of the λ mobile agents $A_i$ executes at 94 the program 30 except as modified by the subscript i as indicated in Algorithm 2. Algorithm 2 steps 8-43 can be compared to Algorithm 1 steps 1-35 to note these differences.

A query q is defined as a question/response mechanism initiated by the sender node $S_q$ of the query to obtain certain information $q_i$ from the recipient node $R_q$ of the query according to the following flow:

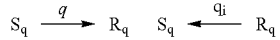

Further, qϵQ, where Q is a predefined master set of possible queries, known to both $S_q$ and $R_q$. The response $q_i$ is returned to $S_q$ (possibly using none, one or more intermediaries) by $R_q$ in a format that $S_q$ understands.

Because of the query function, not all nodes in the graph G need to be visited by a mobile agent. Thus, mobile agents need only visit selective nodes. Those nodes which need the code or data carried by the mobile agent can be selected using the reply/response mechanism. This mechanism includes an ability to determine the local topology $S_v$ around a sensor node to aid the vertex visiting process, where $S_v \subset G$.

The depth (d) of a query q is defined such that, if d=1, the query reaches all xϵV(G) where xϵN($S_q$). In other words, the query reaches all of the one hop neighbors of the sender node $S_q$. Such a set of nodes is called $N_1(S_q)$. All such nodes individually reply to the query. If d=2, the query reaches all xϵV(G) such that $$x \in N_1(S_q) \lor \exists y \in V(G) | y \in N_1(S_q) \hat{} x \in N_1(y)$$

In other words, the query reaches all of the one hop neighbors y of the sender node $S_q$ and all of the one hop neighbors x of the nodes y. Such a set of nodes is called $N_2(S_q)$. Similarly, for d=3, the query reaches all xϵV(G) such that $$x \in N_1(S_q) \lor x \in N_2(S_q) \lor$$

$$\exists y \in V(G) | y \in N_2(S_q) \hat{} x \in N_1(y)$$

Queries can be used when the cost of queries is low compared to the cost of mobile agents. A hybrid scheme using queries and agents will work when the use of queries minimizes the total cost. Once local topological knowledge S is built, agents need not visit vertices x such that $N(x) \subset S$. Let $S_q$ be the originator of the queries, and let qϵQ be the query request. The total transmission cost of queries is proportional to the size of information in the queries. If $d_{max}$ is the maximum degree of any vertex in a neighborhood S, the total cost of transmission of queries is bounded as given by the following:

$$Cost_{tx} \leq \sum_{0 \leq k \leq d-1} (q + ku)d_{max}^{k-1}$$

where d is depth, q is the cost of transmitting the query, and u is the additional cost of a node identifier. The reception cost of the queries is bounded as given by the following:

$$Cost_{rx} \leq q' \left( \frac{d_{max}^{d+1} - (d+1)d_{max}^d + 1}{(d_{max} - 1)^2} \right)$$

where q' is the cost associated with the reply to the query. The cost saved due to queries is $(D_t^i + S_t^i)S'$ where $S' \subset S$ is the set of vertices such that $\forall x \in S'$, $N_1(x) \subset S$. Hence, for queries to be cost effective, $$\sum_{0 \leq k \leq d-1} (q + ku)d_{max}^{k-1} + q' \left( \frac{d_{max}^{d+1} - (d+1)d_{max}^d + 1}{(d_{max} - 1)^2} \right) \leq (D_t^i + S_t^i)S'$$

From this expression, some conclusions can be drawn about when queries are useful. Queries turn expensive in regions where the degree of vertices is high. The query depth should be sufficiently small because reception cost increases exponentially with query depth d. However, if query depth is not sufficient, enough insight into the local topology of the network may not be gained and the information may not be useful. A small value of q and q' will lead to more cost effective queries. Further, queries are useful in large deployments where the itinerary history of the mobile agent is large.

It is worthy of note that, in the scenario of queries, the function g( ) is evaluated at each node either by the visiting mobile agent A or by the query. The receipt of the query executes the function.

Algorithm 4 can be used to reach every sensor using queries and agent movement.

---

Algorithm 4 - Algorithm to visit vertices in G using agent A and queries.

---

Require: u ← ID of the current vertex
1. while 1 do
2.    if agentState == firstVisit then
3.       $N_d(u)$ ← Query(u,d) {Build local topological information using queries of depth d from vertex u}
4.       $R_u = N_1(N_d(u)) - N_d(u)$
5.       if $R_u == \Phi$ then
6.          agentState = recede
7.          jump(A,u,topOfStack(stack))
8.       end if
9.       determine w ∈ $R_u$ such that f(w) ∉stack
10.       jump(A,u,w)
11.    else
12.       pop(stack) {agent state is recede}
13.       find w ∈ $R_u$ such that f(w) ∉stack
14.       if ∄ w then
15.          jump(A,u,topOfStack(stack))
16.       end if
17.       agentState = firstVisit
18.       jump(A,u,w)
19.    end if
20. end while

---

Figure 5A:
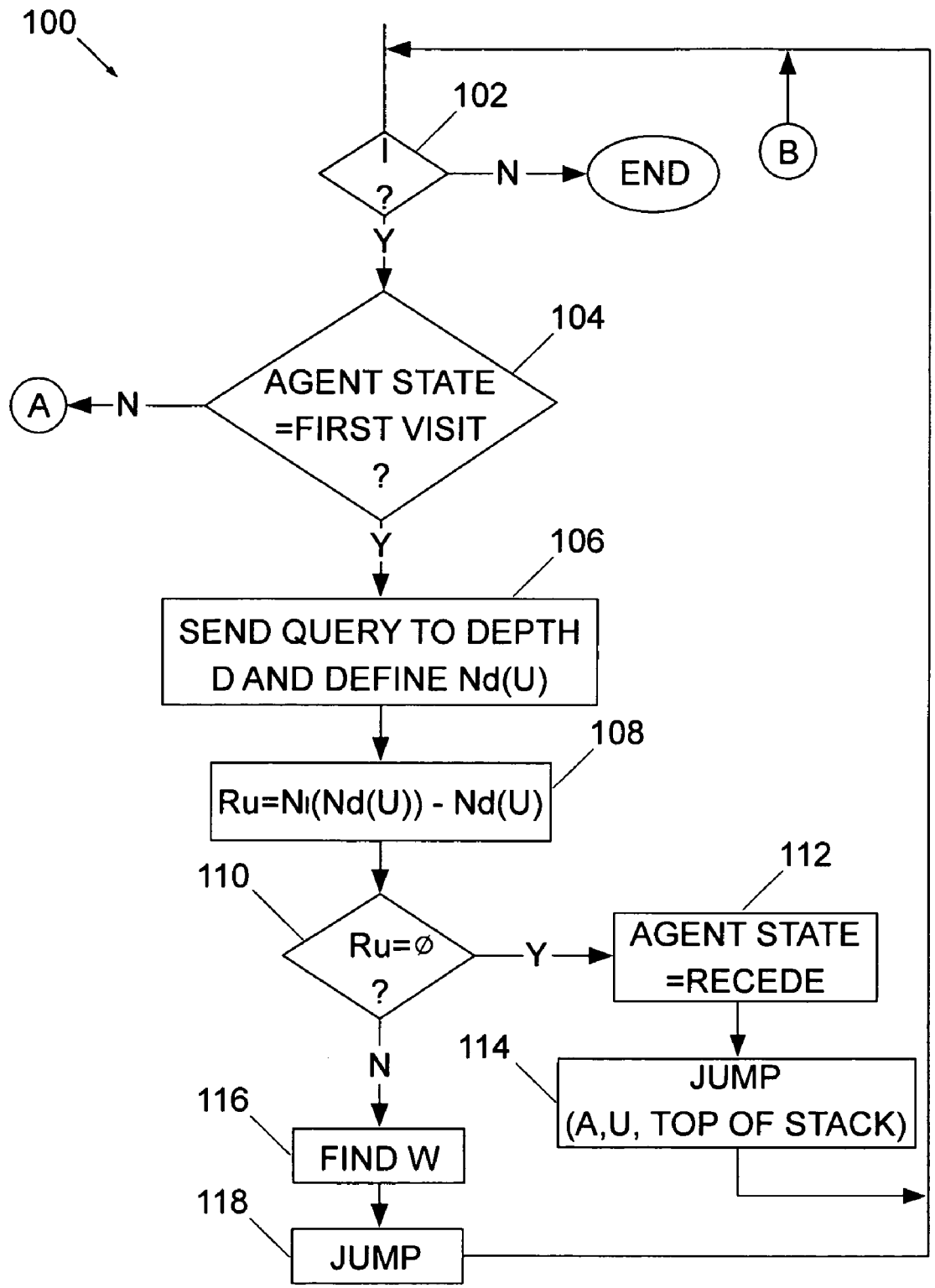
Figure 5B:
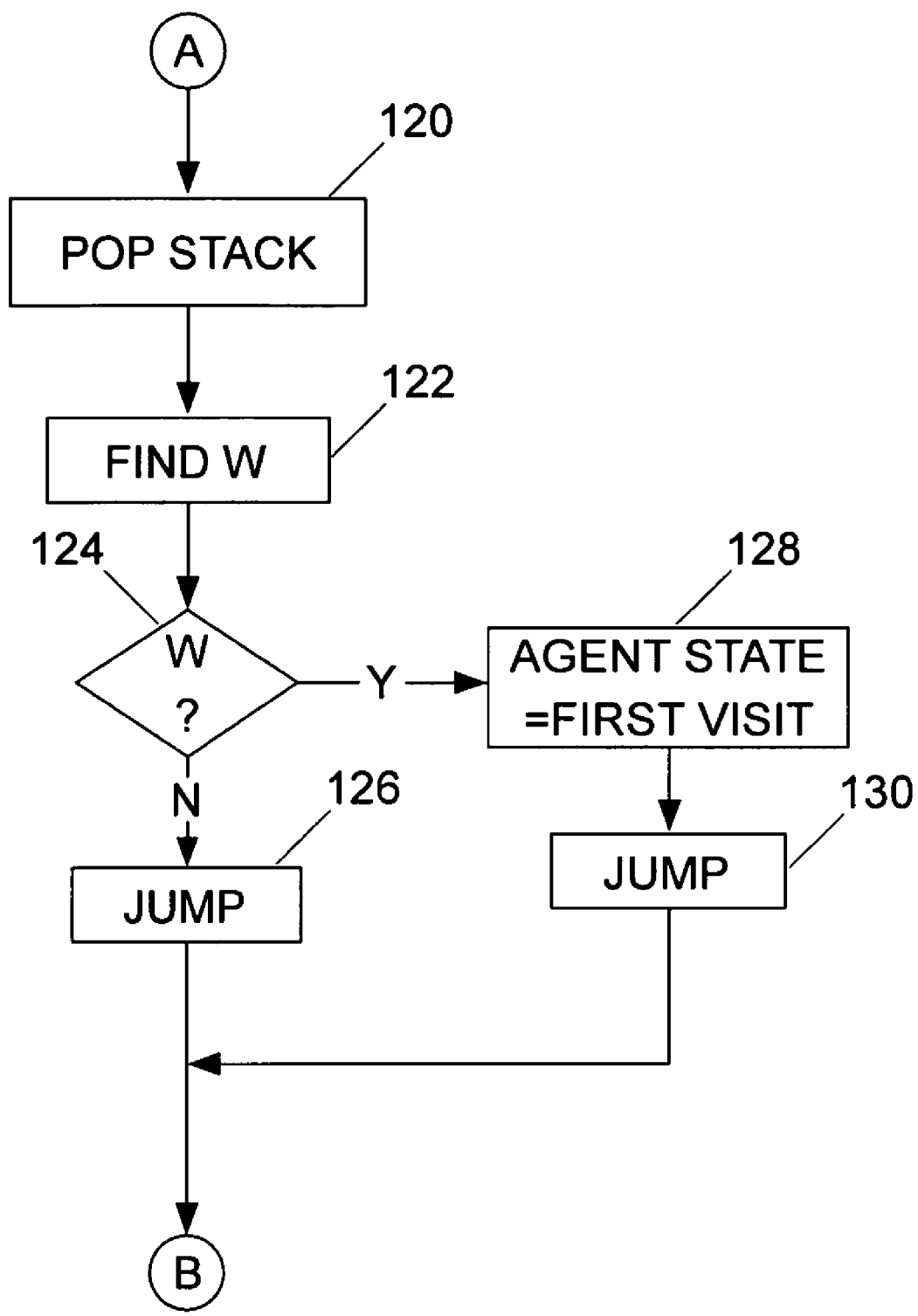

This Algorithm 4 is shown graphically in FIGS. 5A and 5B by the flow chart of a program 100 that is executed by a mobile agent A. The mobile agent A travels to various sensors, and then executes on these sensors. At 102 of the program 100, which represents an infinite loop, the mobile agent A begins execution at its first node, u, by adding node u to the top of Stack and by setting its variable agentState to firstVisit to indicate that the mobile agent has not been to this node before. However, when the stack carried by the mobile agent becomes empty, the algorithm terminates.

If there is at least one node identifier in Stack, and if the agentState variable of the mobile agent is firstVisit as determined at 104, the mobile agent, at 106, sends out one or more queries q selected from the predetermined set Q to a predefined depth d of nodes and receives the responses from these nodes. The query triggers an appropriate action, such as execution of application g( ), at the nodes to which it is sent and causes the nodes receiving the query to send back a response to node u. From these responses, the mobile agent adds the nodes responding to the query to the local topology $N_d(u)$, i.e., the topology of all nodes at depth d from the current node u that have answered the query.

Based on the local topology $N_d(u)$, the mobile agent at 108 determines $R_u$ as the difference between the nodes in $N_1(N_d(u))$ and the nodes in $N_d(u)$. The nodes in the set $N_1(N_d(u))$ includes all of the nodes that are neighbors of the nodes in $N_d(u)$. In effect, the nodes in the set $N_1(N_d(u))$ includes all of the nodes that are in $N_d(u)$ plus all of the nodes at depth 1 from the nodes in $N_d(u)$. The set $R_u$ is empty if all of the nodes at depth d from the current node u have only neighbors within the set $N_d(U)$, in which case queries have reached all nodes in the graph G and the mobile agent does not need to be dispatched further.

If $R_u$ is empty as determined at 110, the variable agentState is set to recede at 112, the mobile agent at 114 jumps from the current node u to the node whose identifier is at the top of Stack, and program flow returns to 102.

If $R_u$ is not empty as determined at 110, a node w is found at 116 such that the node w is in $R_u$ and such that the identifier of the node w is not in Stack. The mobile agent at 118 jumps from the current node u to the node w, and program flow returns to 102.

If the variable agentState of the mobile agent is not firstVisit as determined at 104, the mobile agent removes (pops) the node identifier from the top of Stack at 120, and the mobile agent finds a node w at 122 such that w is in $R_u$ and such that the node identifier for the node w is not in Stack.

If no such node w is found at 122 as determined at 124, the mobile agent at 126 jumps from the current node u to the node whose identifier is at the top of Stack, and program flow returns to 102. If such a node w is found at 122 as determined at 124, the variable agentState is set to firstVisit at 128, the mobile agent at 130 jumps from the current node u to the node w, and program flow returns to 102.

All jumps in Algorithm 4 are executed in accordance with equation (3).

Certain modifications of the present invention have been discussed above. Other modifications of the present invention will occur to those practicing in the art of the present invention. For example, Algorithms 2 and 4 may be combined so that the they operate with respect to multiple agents.

In addition, the present invention has been described with particular reference to sensor networks. However, the present invention has applicability with other networks as well.

Moreover, as discussed above, Algorithms 1, 2, 3, and 4 are executed by one or more mobile agents. However, Algorithms 1, 2, 3, and 4 may instead be executed by the sensors of the network 10. In this case, the mobile agents still carry the data structures such as Stack and the Exceptions Lists described above as well as the function(s) g( ) to be performed by the mobile agent(s) at the nodes of the network 10.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of traversing a network having a plurality of nodes comprising:
    launching multiple mobile agents each capable of performing at least one function;
    traversing the nodes of the network with the multiple mobile agents; and
    performing the at least one function at each of at least some of the nodes in the network, wherein the at least one function is performed by the mobile agents;
    wherein traversing the nodes of the network with the multiple mobile agents comprises labeling each of the nodes with a label uniquely corresponding to the mobile agent that first visits the node, wherein each node is labeled only by the mobile agent that first visits the node.

2. The method of claim 1 wherein each of the mobile agents carries a data structure and the at least one function.

3. The method of claim 2 wherein the data structure carried by each of the mobile agents comprises a stack containing node identifiers associated with the nodes visited by that mobile agent.

4. The method of claim 1 wherein the performing of the at least one function comprises performing the at least one function at each of the nodes only by the mobile agents that first visit the nodes.

5. The method of claim 1 wherein the performing of the at least one function comprises depositing data at the nodes.

6. The method of claim 1 wherein the performing of the at least one function comprises collecting data from the nodes.

7. The method of claim 1 wherein the performing of the at least one function comprises depositing software at the nodes.

8. A method of traversing a network having a plurality of nodes comprising:
    launching multiple mobile agents each capable of performing at least one function;
    traversing the nodes of the network with the multiple mobile agents; and
    performing the at least one function at each of at least some of the nodes in the network, wherein the at least one function is performed by the mobile agents;
    wherein the mobile agents comprise network traversing mobile agents; and
    wherein the launching of the multiple mobile agents comprises:
        selecting a path comprising a subset of the nodes of the network;
        traversing the path with a path traversing mobile agent such that the path traversing mobile agent labels each of the nodes in the path with a uniquely different label;
        launching the network traversing mobile agents such that each of the network traversing mobile agents is uniquely associated with one of the labels;
        traversing the path with the network traversing mobile agents such that each of the network traversing mobile agents finds the node in the subset having a label that matches its label; and
        traversing the network with the network traversing mobile agents such that each of the network traversing mobile agents begins traversal of the network at the node in the path having the label that matches its label.

9. The method of claim 8 wherein the launching of the network traversing mobile agents comprises replicating the path traversing mobile agent to produce the network traversing mobile agents.

10. A method of traversing a network having a plurality of nodes comprising:
launching multiple mobile agents each capable of performing at least one function;
traversing the nodes of the network with the multiple mobile agents; and
performing the at least one function at each of at least some of the nodes in the network, wherein the at least one function is performed by the mobile agents;
wherein the traversing of the nodes of the network comprises:
adding node identifiers to stacks carried by the mobile agents, wherein the added node identifiers correspond to nodes first visited by the mobile agents; and
removing node identifiers from the stacks carried by the mobile agents, wherein the removed node identifiers correspond to nodes visited by the mobile agents for a second time.

11. A method of traversing a network having a plurality of nodes comprising:
launching multiple mobile agents each capable of performing at least one function;
traversing the nodes of the network with the multiple mobile agents; and
performing the at least one function at each of at least some of the nodes in the network, wherein the at least one function is performed by the mobile agents;
wherein the traversing of the nodes of the network comprises:
acquiring a list of neighbors of a node visited by one of the mobile agents;
determining if the one mobile agent has visited the neighbors;
transmitting the one mobile agent to one of the neighbors only if the one mobile agent had not previously visited the one neighbor; and
transmitting the one mobile agent to a node previously visited by the one mobile agent if all the neighbors had been previously visited.

12. A method of traversing a network by a query mobile agent, wherein the network includes a plurality of nodes, wherein the method comprises:
while the query mobile agent is visiting one of the nodes of the network, transmitting a query to at least some other nodes of the network;
receiving responses to the query;
identifying from the responses another of the nodes of the network;
transmitting the query mobile agent to the another node; and
repeating the transmitting steps, the receiving step, and the identifying step at least at the another node;
wherein identifying from the responses another of the nodes comprises:
identifying one or more of the other nodes that the query mobile agent has not yet visited; and
selecting one of the one or more other nodes that the query mobile agent has not yet visited.

13. The method of claim 12 wherein the transmitting of the query comprises selecting the query from a predefined set of queries.

14. The method of claim 13 wherein the identifying from the responses of another of the nodes of the network comprises:
determining a difference between neighbors of nodes identified by the responses and the nodes identified by the responses;
identifying the another node from the difference.

15. The method of claim 14 further comprising:
adding an identifier of a current node to a data structure if the query mobile agent is visiting the current node for the first time;
wherein the identifying of the another node from the difference comprises finding a node in the difference whose node identifier is not in the data structure.

16. The method of claim 14 wherein the query mobile agent carries a data structure, and wherein the identifying of the another node from the difference comprises:
determining whether the difference is an empty set; and
if the difference is an empty set, transmitting the query mobile agent to a node identified by the data structure.

17. The method of claim 16 wherein the identifying of the another node from the difference further comprises:
if the difference is not an empty set, finding a node in the difference whose node identifier is not in the data structure;
adding the another node to the data structure; and,
transmitting the query mobile agent to the node in the difference whose node identifier is not in the data structure.

18. The method of claim 17 further comprising removing the node identified by the data structure from the data structure if the query mobile agent is repeating a visit to the node.

19. The method of claim 12 wherein the transmitting of the query to the at least some other nodes of the network triggers execution of an application at the at least some other nodes of the network.

20. A method of traversing a network having a plurality of nodes comprising:
transmitting a mobile agent to one of the nodes of the network;
executing the mobile agent to reconfigure the one node of the network; and
repeating the transmitting and executing steps so that at least some other nodes of the network are visited by the mobile agent;
wherein transmitting the mobile agent comprises:
adding node identifiers to a stack carried by the mobile agent, wherein the added node identifiers correspond to nodes first visited by the mobile agent; and
removing node identifiers from the stack, wherein the removed node identifiers correspond to nodes visited by the mobile agent for a second time.

21. The method of claim 20 wherein each of the mobile agents carries a data structure and a function permitting the mobile agent to be executed so as to reconfigure the at least some nodes, the data structure including the stack.

22. The method of claim 20 wherein the executing of the mobile agent to reconfigure the one node of the network comprises depositing data at the one node.

23. The method of claim 20 further comprising collecting data from the one node.

24. The method of claim 20 wherein the executing of the mobile agent to reconfigure the one node of the network comprises depositing software at the one node.

25. A method of traversing a network having a plurality of nodes comprising: transmitting a mobile agent to one of the nodes of the network; executing the mobile agent to reconfigure the one node of the network; and repeating the transmitting and executing steps so that at least some other nodes of the network are visited by the mobile agent, wherein the repeating of the transmitting and executing steps comprises:

acquiring a list of neighbors of the one node;

determining if the mobile agent has visited the neighbors;

transmitting the mobile agent to one of the neighbors only if the mobile agent had not previously visited the one neighbor; and transmitting the mobile agent to a node previously visited by the mobile agent if all the neighbors had been previously visited by the mobile agent.

* * * * *